United States Patent [19]

Williams, Jr.

[11] Patent Number: 4,797,043

[45] Date of Patent: Jan. 10, 1989

[54] LOAD SHORING BEAM FOR CARGO TRUCKS

[76] Inventor: John J. Williams, Jr., 9543 Horton, Overland Park, Kans. 66212

[21] Appl. No.: 123,716

[22] Filed: Nov. 23, 1987

[51] Int. Cl.$^4$ ................................................. B60P 7/08
[52] U.S. Cl. ..................................... 410/145; 410/129; 410/151
[58] Field of Search ............... 410/145, 144, 143, 121, 410/151, 150, 142, 130, 132, 139, 129, 149; 248/354.3

[56] References Cited

U.S. PATENT DOCUMENTS

| | | | |
|---|---|---|---|
| 1,951,660 | 3/1934 | Klaudt | 410/145 |
| 2,263,698 | 11/1941 | Hodgson | 410/151 |
| 2,873,695 | 2/1959 | Tobin | 410/145 |
| 3,880,394 | 4/1975 | Wisecarver | 410/151 |
| 3,984,118 | 10/1976 | Wilson | 410/121 |

Primary Examiner—Robert B. Reeves
Assistant Examiner—Joseph D. Pape
Attorney, Agent, or Firm—Kokjer, Kircher, Bradley, Wharton, Bowman & Johnson

[57] ABSTRACT

A cargo shoring bar which extends between slotted tracks on the opposite side walls of a truck body. A pair of telescoping tubes have an internal screw and nut mechanism which allows the tubes to be extended and retracted by threaded action when they are turned relative to one another in opposite directions. An end fitting on one tube fits closely in a slot on one track and the opposite slot receives a cylindrical peg on the end of the other tube. Its cylindrical shape allows the peg to turn in its slot so that the tube which carries it can be turned to tightly wedge the shoring beam between the tracks. Optional hoops are fixed at one end to one tube and at the other end to a sleeve fitted closely on the other tube.

13 Claims, 1 Drawing Sheet

LOAD SHORING BEAM FOR CARGO TRUCKS

BACKGROUND AND SUMMARY OF THE INVENTION

This invention relates generally to the restraint of cargo and deals more particularly with a shoring beam which prevents cargo from shifting in a truck body.

Various types of cargo restraints have been used for restraining the loads which are carried in large over the road trucks. The cargo restraints may serve as bulkheads which separate the cargo in one section of the truck from the cargo in other sections. If the truck is only partly full, the cargo restraints extend across the back of the part of the truck that contains the cargo in order to restrain it against movement into the vacant area of the truck. When boxes or other containers are stacked in the truck, it is necessary to provide a restraint across the upper boxes to prevent them from falling.

Among the types of devices that have been used to restrain cargo are cargo bars of which there are two general types currently in use. One type carries pads on its opposite ends which are tightened against the opposite side walls of the truck when the bar is expanded. The other type of cargo bar that is widely used includes specially shaped end fittings that mate with tracks which are mounted on the opposite side walls of the truck. The present invention is directed to a shoring bar which is used with a track system.

Typically, the shoring bars that are used with tracks include a center tube and two smaller tubes or rods which extend out of the opposite ends of the main tube. One rod is spring loaded to retain special fittings on opposite ends of the bar in slots which are formed in the tracks. The rod on the opposite end of the device is usually provided with plural openings which are pinned to the main tube to provide adjustability in the length of the bar so that different truck widths can be accommodated. This type of bar has a relatively complicated construction and relies entirely on spring force to maintain it in place. The spring force is not always sufficient to prevent the bar from being dislodged by the loads applied by the cargo, particularly if the loads are rather substantial due to quick stops or changes of direction of the vehicle.

The present invention is directed to an improved shoring beam which may be locked in place more securely than other shoring bars. In accordance with the invention, a relatively short tube is fitted telescopically on a longer tube. The short tube carries an internal screw which extends through a nut mounted within the larger tube. Consequently, the two tubes can be rotated relative to one another to extend and retract the tubes longitudinally, thus varying the overall length of the tube assembly. The outer end of the long tube has a tip fitting which is closely received in the track opening on one side of the truck body. The other end of the short tube has a cylindrical peg on its end which fits in and yet is able to turn in the corresponding track opening on the opposite side of the truck. Thus, the short tube can be turned even after the two fittings have entered the track openings, and the shoring beam can be expanded between the opposing tracks so tightly that it is able to withstand even the heaviest loads that are applied to it in service.

specially mounted hoops may be provided on the shoring beam as an option which enhances its ability to restrain boxes and other small items of cargo. Each hoop has one end fixed to the long tube and the other end fixed to a sleeve which is fitted loosely on the shorter tube. This construction permits the hoops to be positioned against the cargo, and the short tube can then be turned to tightly wedge the shoring beam in place without disturbing the position of the hoops, since the short tube is able to turn within the sleeve to avoid turning the hoops.

DESCRIPTION OF THE DRAWING

In the accompanying drawing which forms a part of the specification and is to be read in conjunction therewith and in which like reference numerals are used to indicate like parts in the various views.

DETAILED DESCRIPTION OF THE INVENTION

Figure 1:
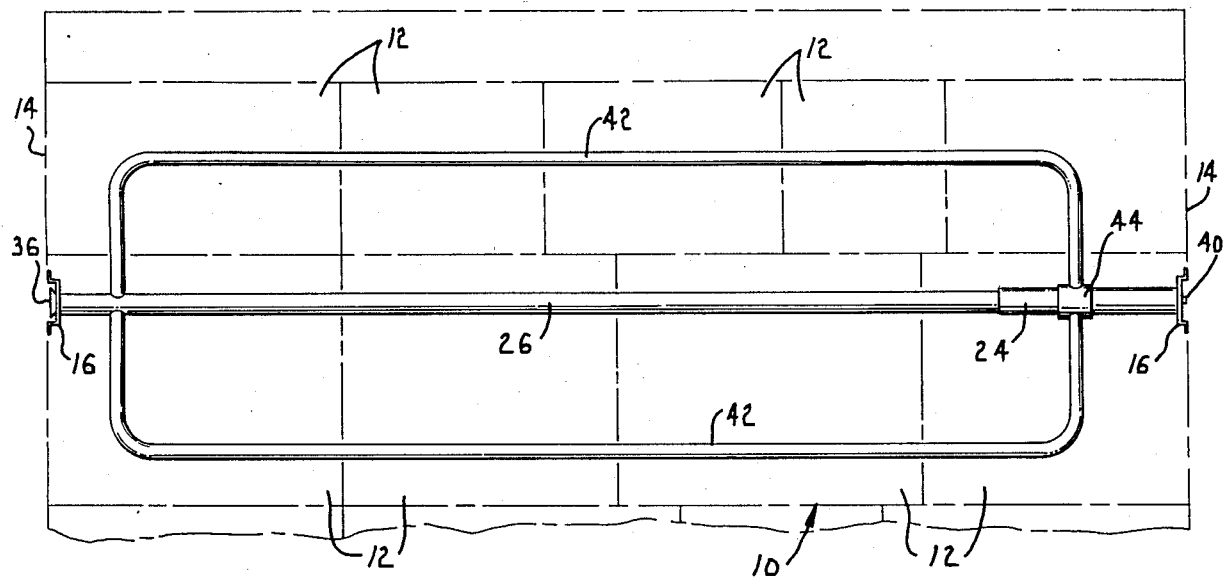
FIG. 1 is a rear elevational showing the shoring beam of the present invention installed in a truck body to restrain cargo.

Referring now to the drawing in more detail and initially to FIG. 1, reference numeral 10 generally designates a shoring beam constructed in accordance with a preferred embodiment of the present invention. The shoring beam 10 is used to restrain cargo such as the stacked cargo boxes 12 that are carried within a large over the road truck-trailer body having opposite side walls 14. Each side wall 14 is provided with one or more horizontal tracks 16. The tracks 16 may be conventional and include top and bottom flanges 18 which fit flatly against the truck walls 14 and may be secured thereto by screws 20 or other suitable fasteners (see FIGS. 2–4). The main body of each track 16 is spaced from the wall 14 and is provided with a plurality of spaced apart slots 22 which are oriented vertically. The two tracks 16 are directly across the truck body from one another, and the corresponding track slots 22 are directly opposite one another.

The shoring beam 10 includes a relatively short cylindrical tube 24 and a longer cylindrical tube 26 which fits telescopically in tube 24. The tubes 24 and 26 are straight and rigid and may be constructed of a suitable metal. The telescopic fit of tube 26 in tube 24 is such that the two tubes can rotate relative to one another and can be telescopically extended and retracted in order to vary the overall length of the tube assembly which is provided by the two tubes. Preferably, the fit between the two tubes 24 and 26 is rather close to enhance the rigidity of the tube assembly.

Figure 2:
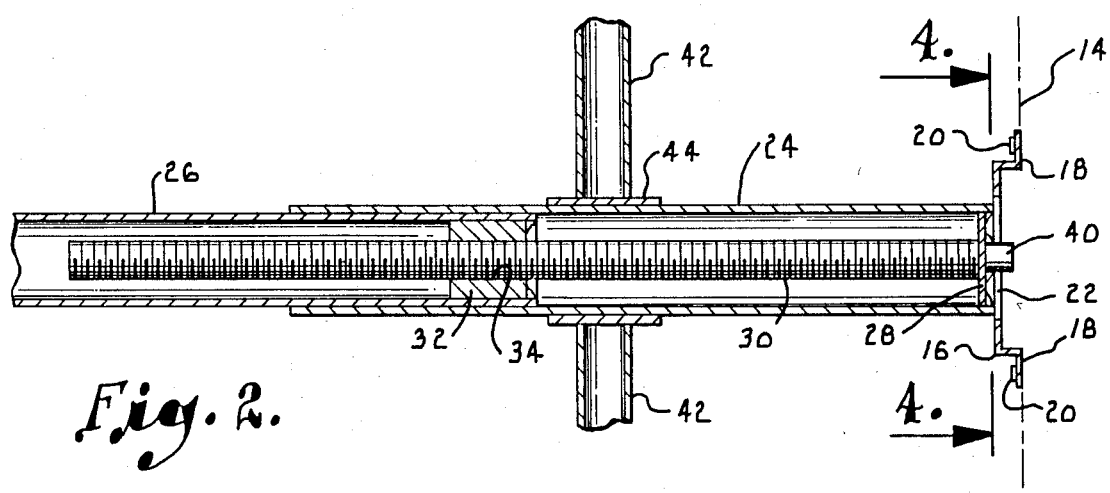
FIG. 2 is a fragmentary sectional view on an enlarged scale of the right end portion of the shoring beam.

As best shown in FIG. 2, the right or outer end of tube 24 is provided with a rigid end disk or plate 28 which may be welded to the tube wall within the end of the tube. An externally threaded screw 30 is secured at one end to the center of end plate 28 and extends within tube 24 along its longitudinal axis. Screw 30 may extend beyond the opposite or inner end of tube 24 although its length can be varied as desired. The end of tube 26 which fits within tube 24 is provide with a nut 32 which may be welded or otherwise secured adjacent to and within the end of tube 26. The nut 32 has an internally threaded passage 34 which is concentric with the longitudinal axis of tube 26. The screw 30 extends through passage 34 with the threads on the screw mating with those on the nut. Consequently, when tube 24 is turned in opposite directions relative to tubde 26, the two tubes are axially extended and retracted to increase and decrease the overall length of the tube assembly.

Figure 3:
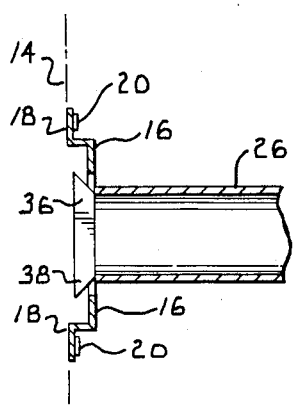
FIG. 3 is a fragmentary sectional view on an enlarged scale showing the left end portion of the shoring beam.

With reference to FIG. 3 in particular, the outer or left end of tube 26 is provided on its tip with a generally rectangular block 36. The block 36 has a size and shape to fit closely in the rectangular slots 22. Block 36 has a beveled surface 38 which facilitates entry of the block into slot 22.

Figure 4:
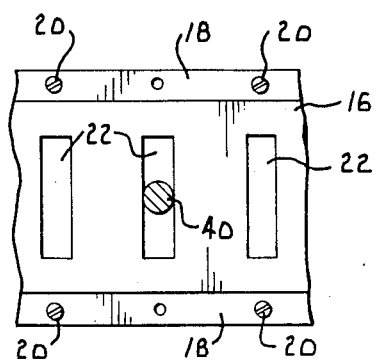
FIG. 4 is a fragmentary sectional view taken generally along line 4—4 of FIG. 2 in the direction of the arrows.

Referring again to FIG. 2 in particular, the right or outer end of tube 24 has on its tip a projecting peg 40 which is welded or otherwise secured to the end plate 28 to extend therefrom in a direction opposite the screw 30. Peg 40 is cylindrical and projects outwardly beyond the end of tube 24. As best shown in FIG. 4, the diameter of peg 40 is slightly less than the width of each slot 22, and the peg 40 can thus be fitted in the slots 22. It is noted that the peg 40 can axially turn in the slot 22 which receives it.

The shoring beam 10 may be provided with a cargo restraining hoop arrangement formed by two generally C shaped hoops 42. Each hoop 42 has a length somewhat less than the length of the tube assembly. Each hoop 42 has one end welded or otherwise fixed to tube 26 near its left or outer end. The opposite end of each hoop 42 is fixed to a small cylindrical sleeve 44 which fits rotatably on tube 24. The two hoops 42 occupy a common plane so that they can be placed flatly against cargo such as the different tiers of stacked boxes 12 shown in FIG. 1. Each hoop 42 may be constructed of a hollow metal tube. It should be noted that sleeve 44 may rotate on tube 24 and may slide axially thereon.

In use, the shoring beam 10 is applied to the truck body by first turning tube 24 in a direction to retract it until the tube assembly is short enough to fit between the opposing tracks 16. The shoring beam is then extended between the tracks and is placed against the cargo boxes 12 with the two hoops 42 (if provided) engaging the boxes. Block 36 may then be inserted into the appropriate slot 22, and tube 24 may be rotated by hand in a direction to extend it so that peg 40 is able to enter the slot 22 which is opposite to and corresponds to the slot which receives block 36.

It is an important feature of the invention that the rotation of tube 24 may be continued even after pin 40 has entered slot 22. As a consequence, tube 24 may be rotated until the shoring beam 10 is wedged as tightly as desired between the two opposing tracks 16. The mechanical advantage provided by the threaded engagement between screw 30 and nut 32 permits an extremely tight, wedging fit of the shoring beam 10 between the opposite side walls 14 of the truck body to be achieved without undue effort or the need for tools or other special devices. This tight fit of the shoring beam maintains it in place with adequate security to resist dislodgement due to the forces of the cargo bearing against it, vibrational forces, and other forces to which the beam is subjected while in service.

It is pointed out that tube 24 is able to turn within sleeve 44 so that the shoring beam 10 can be tightened to the extend desired without turning or otherwise disturbing the position of the hoops 42. Therefore, the hoops 42 remain properly in position to restrain the cargo. Although the cargo hoops 42 are not necessary in all applications, they provide benefits in many situations in that they increase the effective surface area of the shoring beam and permit it to act over a larger area. The hoops 42 are particularly effective in restraining cargo such as the upper row of boxes 12 shown in FIG. 1.

It is noted that the close fit of block 36 in slot 22 holds tube 26 against rotation as soon as the block has entered the slot. Thus, the ends of hoops 42 which are secured to tube 26 are likewise secured against rotation. The overall result of the manner in which the shoring beam 10 is constructed results in the end which carries block 36 being locked securely to track 16 while the end which carries peg 40 may be turned so that the shoring beam can be tightened as desired. When tube 24 has been turned to tighten the shoring beam, friction between its end and the track 16 holds the tube against counter rotation.

The shoring beam 10 can be removed simply by turning tube 24 in a direction to effect telescopic retraction. This reduces the length of the shoring beam and permits block 36 and peg 40 to eventually be withdrawn from the track slots 22. Once the opposite ends of the beam have been withdrawn from the slots, the shoring beam can be removed.

Figure 5:
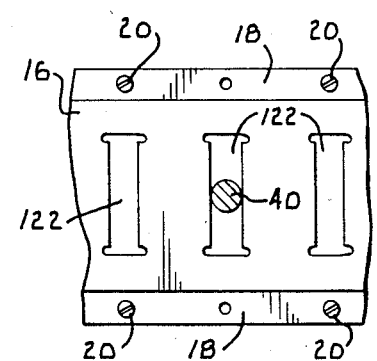
FIG. 5 is a fragmentary view similar to FIG. 4 but showing an alternative configuration for the slots in the track which is mounted in the truck body.

FIG. 5 illustrates an alternative type of track which includes I shaped slots 122 instead of the rectangular slots 22 previously described. In this case, block 36 is replaced by a special fitting which has a size and shape to be closely received in the I-shaped slots 122. Again, peg 40 is able to turn in slots 122. It should be noted that the shoring beam 10 can be used with tracks having round openings or openings having virtually any shape permitting peg 40 to turn in them. The fitting on the opposite end of the shoring beam should have a configuration to fit closely in whatever track openings are present.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A load shoring beam for restraining cargo in a truck body having opposite side walls provided with track openings, said shoring beam comprising:
   a tube assembly comprising first and second cylindrical tubes fitting together telescopically to permit telescopic extension and retraction thereof to respectively lengthen and shorten the tube assembly, each tube presenting on an outer end thereof a tip having a size and shape to enter the track openings;
   an internally threaded nut secured in said first tube;
   an externally threaded screw secured in said second tube and extending through said nut in threaded engagement therewith, said tubes being rotatable relative to one another in opposite directions to lengthen and shorten the tube assembly, thereby permitting the tube assembly to be extended between the opposite side walls with said tips in the track openings and tightened by threaded action effected by relative rotation of the tubes in a direction to lengthen the tube assembly;

a sleeve fitted on said second tube for rotation thereon; and a pair of C-shaped hoops on the tube assembly, each hoop having opposite ends one of which is connected with said first tube and the other of which is connected with said sleeve.

2. the shoring beam of claim 1, wherein:

said nut is secured to said first tube adjacent an end thereof opposite said outer end; and said screw is secured to said outer end of the second tube in extension away from said outer end along a longitudinal axis of the second tube.

3. The shoring beam of claim 2, wherein said tip of the second tube comprises a cylindrical peg having a size to turn in each track opening in which it is received.

4. The shoring beam of claim 3, including a rigid end plate on said outer end of the second tube, said screw and peg extending in opposite directions from said end plate.

5. The shoring beam of claim 1, wherein said tip of the second tube comprises a cylindrical peg having a size to turn in each track opening in which it is received.

6. The shoring beam of claim 5, wherein said tip of the first tube has a size and shape to fit closely in the track openings.

7. A load shoring beam for restraining cargo in a truck body having opposite side walls provided with tracks each having spaced apart track openings, said shoring beam comprising:

a tube assembly comprising first and second cylindrical tubes having a close telescoping fit one within the other and being axially extensible and retractable to adjust the length of the tube assembly;

an outer end of said first tube having a tip shaped to fit closely in the track openings;

an outer end of said second tube having a cylindrical ped thereon sized to be received in the track openings and to axially turn therein;

an internally threaded nut secured to one of said tubes and presenting an internally threaded passage on the axis of said one tube;

an externally threaded screw secured to the other of said tubes and extending along the axis of said other tube through said nut in threaded engagement with said passage to effect lengthening and shortening of the tube assembly upon relative rotation of the tubes in opposite directions, said second tube being rotatable after said tip has entered a track opening on one side of the truck body and said peg has entered a corresponding track opening on the other side of the truck body and said peg being rotatable in the track opening to permit the tube assembly to be tightly wedged between the tracks by threaded action;

a sleeve fitted on said second tube for rotation thereon; and a pair of C-shaped hoops on the tube assembly, each hoop having opposite ends one of which is connected with said first tube and the other of which is connected with said sleeve.

8. The shoring beam of claim 7, including an end plate on the outer end of said second tube, said screw and peg extending in opposite directions from said end plate.

9. The shoring beam of claim 8, wherein said nut is secured in said first tube adjacent the end thereof opposite said outer end.

10. A load shoring beam for restraining cargo in a truck body having opposite side walls provided with tracks each presenting a plurality of track openings, said shoring beam comprising:

a tube assembly comprising first and second cylindrical tubes telescopically interfitting in a manner to be relatively rotatable and axially extensible and retractable to adjust the length of the tube assembly;

an outer end of said first tube having a tip shaped to fit closely in the track openings;

an outer end of said second tube having a cylindrical peg thereon sized to fit in the track openings and to turn axially therein;

means for establishing a threaded connection between said tubes to effect axial extension and retraction upon relative rotation of the tubes in opposite directions, said peg being rotatable in the track opening in which it is fitted to permit turning of said second tube in a direction to axially extend the tube assembly in a tightly wedged fit between the tracks;

hoop means comprising a pair of generally C-shaped hoops each having opposite ends, one end of each hoop being connected rigidly with said first tube; and a sleeve on said second tube, said sleeve being rotatable and axially slidable on said second tube and being connected with the end of each hoop opposite said one end thereof.

11. The shoring beam of claim 10, wherein said means for establishing a threaded connection comprises:

an internally threaded nut secured in one of said tubes and presenting an internally threaded passage on the longitudinal axis of the tube assembly; and an externally threaded screw secured in the other of said tubes and having external threads mating with the threads of said passage.

12. The shoring beam of claim 10, wherein said means for establishing a threaded connection comprises:

an internally threaded nut secured in said first tube in an inner end thereof opposite said outer end thereof; and an externally threaded screw secured in said second tube and extending from said outer end thereof through said nut in threaded engagement therewith.

13. The shoring beam of claim 12, including an end plate on said outer end of the second tube, said peg and screw extending in opposite directions from said end plate.

* * * * *